United States Patent
Gurumoorthy et al.

(10) Patent No.: US 11,516,653 B2
(45) Date of Patent: Nov. 29, 2022

(54) 5G NR SERVICE BASED CELL MOBILITY

(71) Applicant: Apple Inc., Cupertino, CA (US)

(72) Inventors: Sethuraman Gurumoorthy, San Jose, CA (US); Srirang A. Lovlekar, Cupertino, CA (US); Murtaza A. Shikari, Mountain View, CA (US); Haijing Hu, Beijing (CN); Fangli Xu, Beijing (CN); Yuqin Chen, Shenzhen (CN); Sree Ram Kodali, Sunnyvale, CA (US); Xu Ou, San Jose, CA (US); Srinivasan Nimmala, San Jose, CA (US); Longda Xing, San Jose, CA (US); Dawei Zhang, Saratoga, CA (US)

(73) Assignee: Apple Inc., Cupertino, CA (US)

(*) Notice: Subject to any disclaimer, the term of this patent is extended or adjusted under 35 U.S.C. 154(b) by 120 days.

(21) Appl. No.: 17/270,421

(22) PCT Filed: Aug. 29, 2018

(86) PCT No.: PCT/CN2018/102838
§ 371 (c)(1),
(2) Date: Feb. 22, 2021

(87) PCT Pub. No.: WO2020/041990
PCT Pub. Date: Mar. 5, 2020

(65) Prior Publication Data
US 2021/0195405 A1    Jun. 24, 2021

(51) Int. Cl.
*H04W 48/10*    (2009.01)
*H04W 72/12*    (2009.01)
(Continued)

(52) U.S. Cl.
CPC ........... *H04W 8/245* (2013.01); *H04W 48/10* (2013.01); *H04W 72/12* (2013.01); *H04W 76/10* (2018.02)

(58) Field of Classification Search
CPC ...... H04W 76/10; H04W 48/10; H04W 72/12
(Continued)

(56) References Cited

U.S. PATENT DOCUMENTS

| 2014/0293860 | A1 | 2/2014 | Hedge | |
| 2015/0173101 | A1* | 6/2015 | Webb | H04W 72/1273 370/329 |

(Continued)

FOREIGN PATENT DOCUMENTS

CN          108024358 A       5/2018

OTHER PUBLICATIONS

International Search Report and Written Opinion for PCT/CN2018/102838, dated May 30, 2019, 9 pages.

*Primary Examiner* — Angel T Brockman
(74) *Attorney, Agent, or Firm* — Kowert, Hood, Munyon, Rankin & Goetzel, P.C.

(57) ABSTRACT

Base stations, user equipment devices (UEs), and methods for a base station to supply service type-specific information to the UE. The base station may broadcast a first system information block (SIB) comprising scheduling information for a plurality of second SIBs, wherein each of the plurality of second SIBs corresponds to a respective service type of a plurality of service types, and wherein the second SIBs describe service type-specific capabilities of the base station. The plurality of service types may comprise two or more of enhanced mobile broadband, ultra-reliable low latency communications, and massive machine-type communications. The base station may broadcast the plurality of second SIBs according to the scheduling information of the first SIB, and may establish a connection and communicate with the UE using one or more service types and according to the service type-specific capabilities described by second SIBs corresponding to the one or more service types.

20 Claims, 5 Drawing Sheets

(51) Int. Cl.
  *H04W 76/10* (2018.01)
  *H04W 8/24* (2009.01)
(58) Field of Classification Search
  USPC .......................................................... 370/329
  See application file for complete search history.

(56) References Cited

U.S. PATENT DOCUMENTS

| | | |
|---|---|---|
| 2018/0035361 A1 | 2/2018 | Ishii |
| 2018/0070369 A1 | 3/2018 | Papasakellariou |
| 2018/0132165 A1 | 5/2018 | Takahashi et al. |

* cited by examiner

5G NR SERVICE BASED CELL MOBILITY

PRIORITY CLAIM

This application is a national phase entry of PCT application number PCT/CN2018/102838, entitled "5G NR Service Based Cell Mobility," filed Aug. 29, 2018, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to base stations and wireless devices, and more particularly to apparatus, systems, and methods for a base station to broadcast service type-specific system information to one or more types of wireless devices.

DESCRIPTION OF THE RELATED ART

Wireless communication systems are rapidly growing in usage. Further, wireless communication technology has evolved from voice-only communications to also include a plurality of types of service including transmission of different types of data, such as Internet and multimedia content. Additionally, different types of service may be implemented by different types of devices, and may have different latency, throughput, and security requirements. To address these and other concerns, improvements in the field are desired.

SUMMARY

Embodiments relate to base stations, UEs, and methods for broadcasting service type-specific system information and implementing service type-specific mobility protocols.

In some embodiments, a base station may broadcast a first system information block (SIB) comprising scheduling information for a plurality of second SIBs, wherein the first SIB indicates support by the base station for a plurality of service types, wherein each of the plurality of second SIBs corresponds to a respective service type of the plurality of service types, and wherein the second SIBs describe service type-specific capabilities of the base station.

The base station may broadcast the plurality of second SIBs according to the scheduling information of the first SIB, and may establish a connection and communicate with the UE using the one or more service types of the plurality of the service types and according to the service type-specific capabilities described by second SIBs corresponding to the one or more service types.

In some embodiments, the scheduling information may comprise a periodicity and mapping information associated with each of the plurality of second SIBs. Indicating support by the base station for the plurality of service types may comprise including, in the first SIB, a bitmap information element specifying the plurality of service types that are supported by the base station. In some embodiments, the plurality of service types may comprise one or more of enhanced mobile broadband (EMBB), ultra-reliable low latency communications (URLLC), massive machine-type communications (MMTC), and potentially other service types.

The techniques described herein may be implemented in and/or used with a number of different types of devices, including but not limited to base stations (eNBs and/or gNBs), cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1:
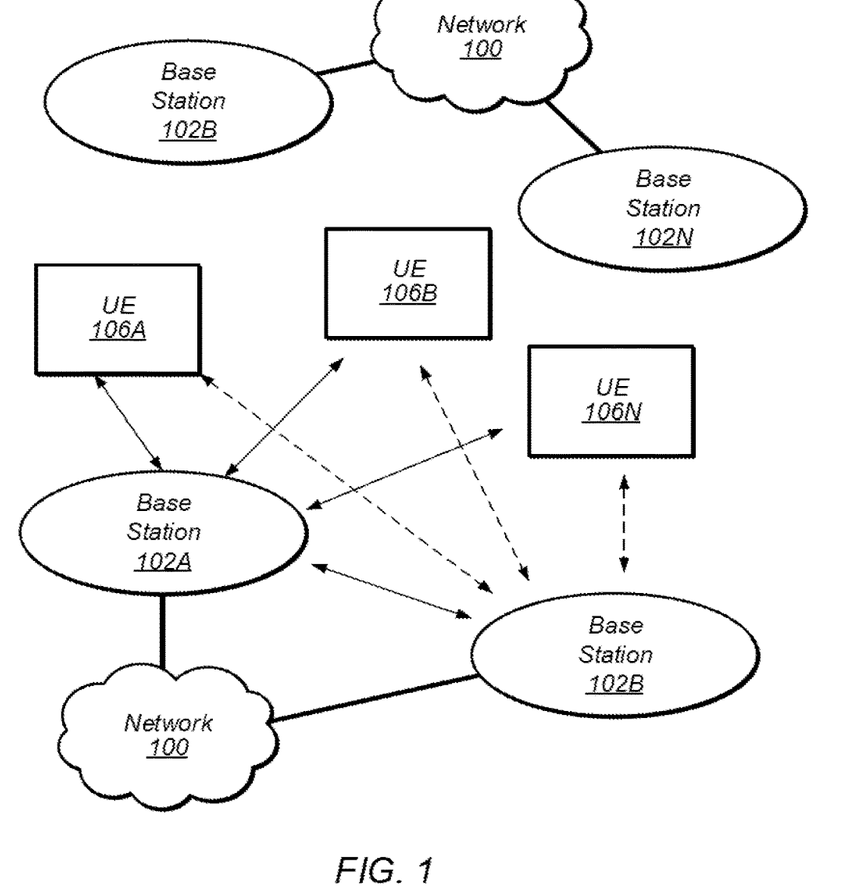
FIG. 1 illustrates an example wireless communication system, according to some embodiments.
Figure 2:
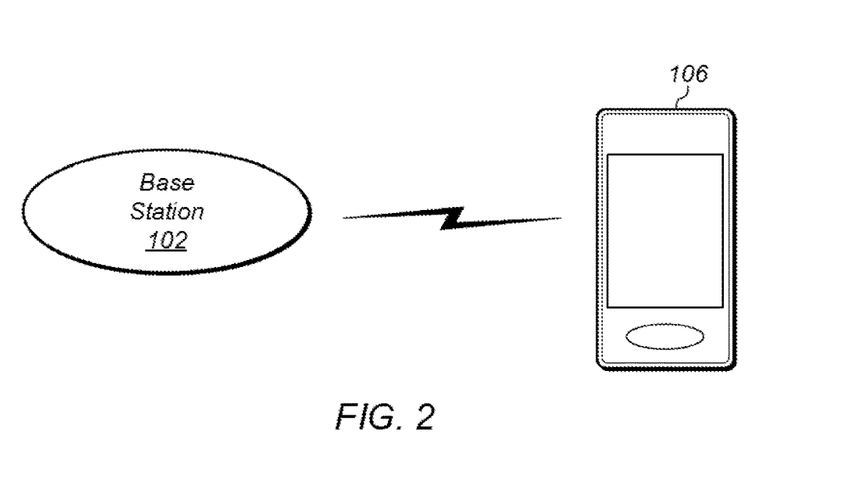
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". For example, UEs 106A-106N may communicate with base station 102B (illustrated with dashed arrows in FIG. 1) in addition to communicating with base station 102A. Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

Figure 3:
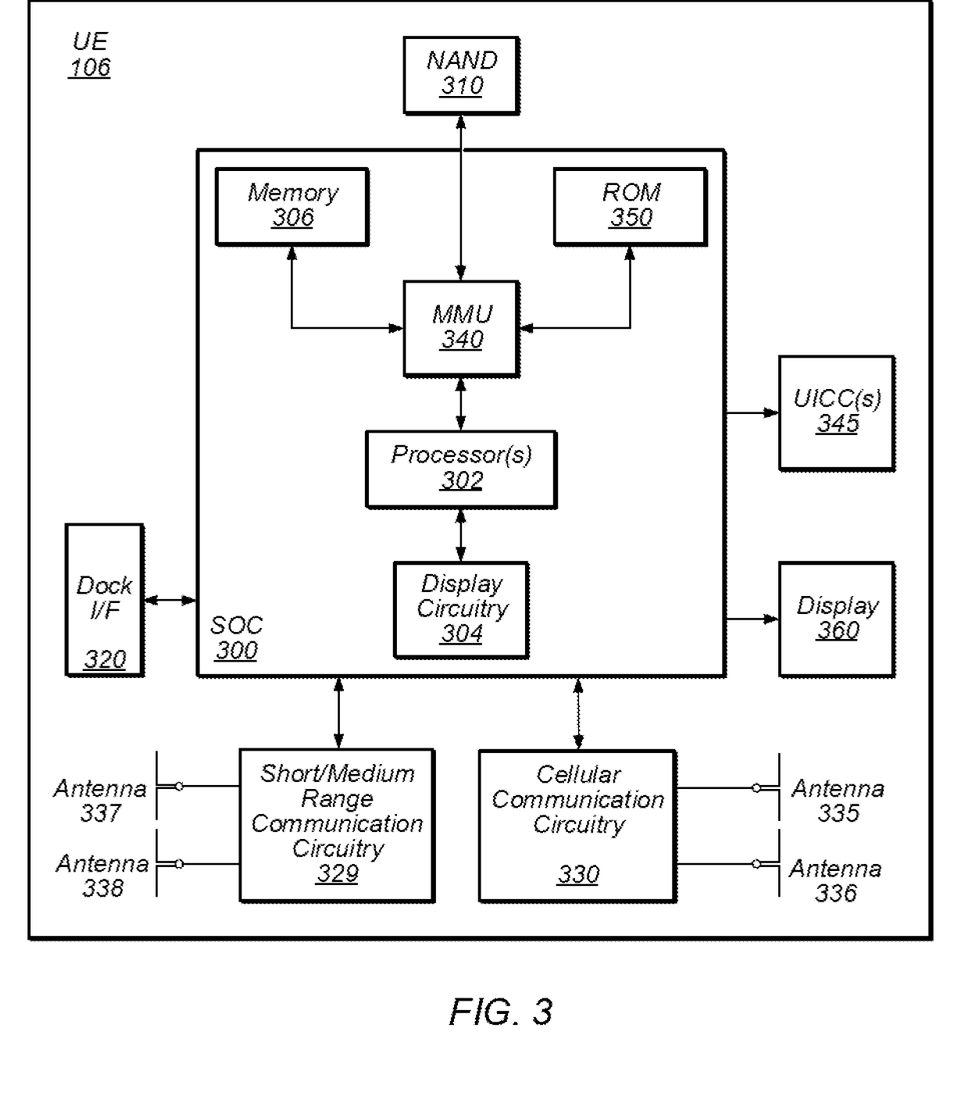
FIG. 3 illustrates an example block diagram of a UE, according to some embodiments.

FIG. 3—Block Diagram of a UE

FIG. 3 illustrates an example simplified block diagram of a communication device or UE 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for standalone (SA) or non-standalone (NSA) New Radio (NR) operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

According to various embodiments, the UE 106 may be capable of utilizing one or more types of service via a base station 102. For example, a particular UE 106A such as a smart phone may be capable of utilizing enhanced mobile broadband (EMBB), another UE 106B such as an autonomous driving vehicle may be capable of utilizing ultra-reliable low latency communications (URLCC), and a third UE 106C such as an internet-of-things device may be capable of utilizing massive machine type communications (MMTC). Other types of UEs may be configured to utilize multiple ones of EMBB, URLCC, and/or MMTC, in addition to potentially other service types.

Figure 4:
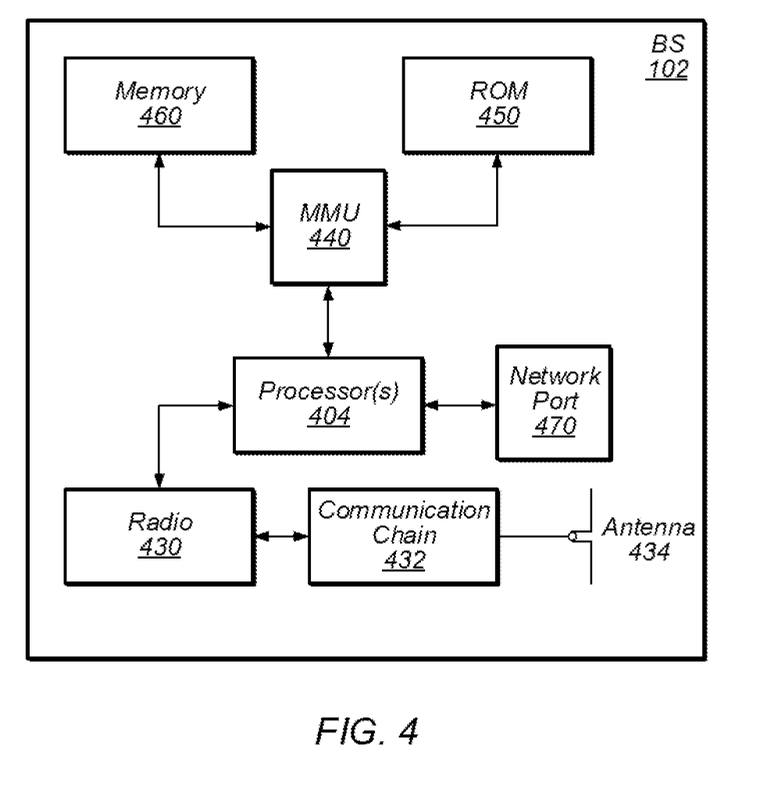
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

According to various embodiments, the base station 102 may be capable of offering one or more types of service to a UE. For example, a particular base station 102A may be capable of offering one or more of enhanced mobile broadband (EMBB), ultra-reliable low latency communications (URLCC), and massive machine type communications (MMTC), while another base station 102B may be capable of offering a different subset of these and/or other service types.

Figure 5:
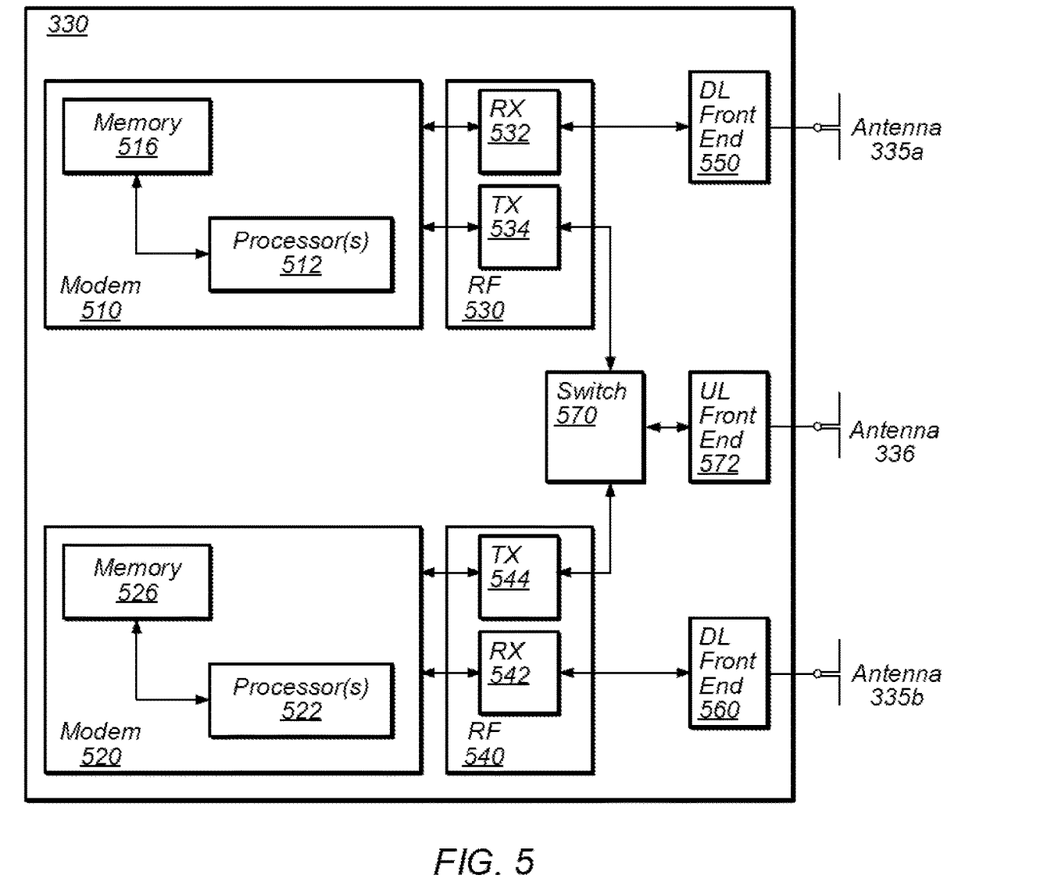
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to establish a first wireless link with a first cell according to a first radio access technology (RAT), wherein the first cell operates in a first system bandwidth and establish a second wireless link with a second cell according to a second radio access technology (RAT), wherein the second cell operates in a second system bandwidth. Further, the cellular communication circuitry 330 may be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some embodiments, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 may be configured to receive an allocation of a first UL subframe for transmissions according to the first RAT and an allocation of a second UL subframe for transmissions according to the second RAT. In some embodiments, the TDM of the uplink data may be performed at a physical layer of the cellular communication circuitry 330. In some embodiments, the cellular communication circuitry 330 may be further configured to receive an allocation of a portion of each UL subframe for control signaling according to one of the first or second RATs.

As described herein, the modem 510 may include hardware and software components for implementing the above features or for time division multiplexing UL data for NSA/SA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for time division multiplexing UL data for NSA/SA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Service Type Specific Cellular Protocols

Cellular technology service may be differentiated into a plurality of different types of service. For example, cellular technology may support a large variety of different types of wireless electronic devices (e.g., smart phones, tablets, smart cars, internet-of-things devices, etc.), and different types of devices may be configured to receive different types of cellular service. For example, it is anticipated that 5G NR may support each enhanced mobile broadband (EMBB), ultra-reliable low latency communications (URLLC), and massive machine type communications (MMTC), among other possible service types. Note that EMBB, URLLC, and MMTC are given for example purposes only, and embodiments herein may be equally applied to other existing or not-yet existing service types, as desired.

Diversity of device types and their associated service types may complicate the cellular technology environment, as each of the different device and service types may preferentially or even necessarily operate according to different technological specifications and/or with different types of base stations. Embodiments herein attempt to address these and other complications by implementing service-type specific protocols for cellular communications. More specifically, embodiments described herein present methods and devices for service type-specific cell selection, re-selection, handover, and redirection procedures, which may be implemented as part of 5G NR.

Some described embodiments build on top of the current agreements reached within 3GPP RAN2. For example, current implementations and proposals do not include a scalable mechanism for the 5G NR RAN to indicate the services supported by the cell. Additionally, the current set of agreements and proposals does not provide a mechanism to provide service specific cell selection/reselection parameters for the UE, nor does it consider service type as a parameter for other mobility scenarios such as handover and redirection. Additionally, the applicability of a service type specific configuration for radio resource control (RRC) inactive mode has not been specified. Embodiments described herein address these and other concerns by presenting methods and devices for implementing scalable service type specific protocols for use in cellular communications.

In 5G NR, given that different UEs and/or different types of UEs may have differentiated service type requirements, it may be advantageous for the UEs to choose a base station (BS) to camp on which supports the list of services that the UE is interested in. Given the massive density of UEs in some areas (e.g., in urban areas, concerts, sporting events, etc.), it may be desirable for network services supporting a given service type to only be accessed by those devices which are expected to utilize that particular service.

According to various embodiments, a BS 102 may inform UEs of a list of supported services using various methodologies. In some embodiments, the BS may provide service specific system information in different types of system information blocks for each of the different service types that it supports. For example, the BS may provide EMBB-specific configuration information in a system information block (SIB) of a first type (e.g., SIB Type X), it may provide URLLC specific configuration information in a second type of SIB (e.g., SIB Type Y), and/or it may provide MMTC specific configuration information in a third type of SIB (e.g., SIB Type Z). The scheduling information of these service type specific SIBs (e.g., SIB Type X, Type Y, and/or Type Z) broadcasted by the BS may provide information to the UE about the service types supported in the cell. Additionally or alternatively, each of these service specific SIBs may provide configuration parameters that impact the UE's service type specific mobility protocols. In other words, the service type specific SIBs may specify configuration parameters for mobility protocols regarding cell selection, cell reselection, handover, and/or redirection procedures for each of the service types.

In some embodiments, the BS may initially broadcast a first SIB that specifies scheduling information for each of one or more upcoming service type specific SIBs. For example, the BS may choose to use SystemInformationBlockType1 to provide the scheduling information for other SIBs, and a sample SIB1 may appear like the following, in some embodiments:

```
SystemInformationBlockType1 {
...
  schedulingInfoList {
    {
      si_periodicity periodicity_X,
      sib_mapping_info {
        sibType_X
      }
    },
    {
      si_periodicity periodicity_Y,
      sib_mapping_info {
        sibType_Y
      }
    },
    {
      si_periodicity periodicity_Z,
      sib_mapping_info {
        sibType_Z
      }
    },
  }
...
}
```

In the exemplary SIB1 message shown above, periodicity and mapping information is included for each of a type X, type Y, and type Z SIB, each of which are associated with a respective service type. A UE, upon receiving the SIB1 message, may then monitor the appropriate radio resources associated with one or more of the type X, Y, or Z SIB to obtain configuration information related to the respective service type.

Broadcasting scheduling for upcoming service type specific SIBs may provide an efficient and scalable method to configure service type specific mobility information to the UE. This may be advantageous, for example, if legacy structuring is used.

In some embodiments, an explicit bitmap information element may be broadcast by the BS to specify which service types are supported by the BS. In these embodiments, the BS may choose to broadcast a new information element (e.g., included within a system information block, broadcast as an independent transmission, or sent to the UE in dedicated signaling message) that assigns individual service types a corresponding position in a pre-defined bitmap. In order to obtain scalability with the potential introduction of new service types in the future, the bitmap may be of variable length, with a corresponding length field identifier. Advantageously, future newly introduced service types may also be incorporated into the bitmap, by clearly defining a length value.

The new bitmap information element may be encoded as a service group indicator (SGI) bitmap as part of the system information (e.g., it may be included within an existing SIB) which may be either broadcasted or scheduled as part of on-demand system information. Advantageously, this may preserve compatibility with proposed 5G NR protocols. A special bit mapping rule in the bitmap information element may indicate if the broadcast 5G NR base station is dedicated for a single service type (for example, it may just have one bit set to one in the entire bitmap). As one example, a SGI bitmap may appear as $[b_7 \ b_6 \ b_5 \ b_4 \ b_3 \ b_2 \ b_1 \ b_0]$, where each bit position $b_n$ (n=0, 1, 2 . . . ) may be either a one or a zero, depending on whether that service is supported in the cell. For example, Table 1 below gives an exemplary structure for an SGI bitmap that specifies whether each of EMBB, URLLC, and MMTC is supported by a particular base station.

TABLE 1

| Bitmap Information Element | |
|---|---|
| Bit Position | Service Type |
| b0 | EMBB |
| b1 | URLLC |
| b2 | MMTC |
| b3 | Reserved |
| b4 | Reserved |
| b5 | Reserved |
| b6 | Reserved |
| b7 | Reserved |

In some embodiments, the SGI bitmap may have a representation mechanism whereby a certain set of bit positions are reserved for 3GPP defined service types, while other remaining bit positions are reserved for any operator specific service types, as desired.

The SGI bitmap may provide a concise way to indicate supported service type(s) to the UE, as each of a plurality of supported service types are indicated within a single concise bitmap. It may also offer utility when this information has to be provided as part of idle/connected mode neighbors. The SGI bitmap offers a concise methodology for informing UEs of the service types supported by a servicing BS. Broadcasting supported service types allows the BS to unambiguously indicate to the devices the type of services that the cell supports. Additionally or alternatively, it may allow the BS to aggregate devices of certain service types and enable prioritization based on service type requirements. It may further enable UEs to prioritize certain cells over others in line with their specific service type requirements. Additionally, the scalable methodology may adapt to future needs, when new additional services may potentially be developed and deployed, as the SGI bitmap may be expanded to further specify support for these additional service types. Alternatively, the service types supported by the base station may be communicated to a UE using an alternative format or delivery methodology, as may be appreciated by one of ordinary skill in the art.

In some embodiments, a UE that supports cell mobility protocols based on service types may indicate the support of this feature as part of its UE capability information. Such a capability advertisement may assist the BS in improving mobility signaling to the UE. For example, the UE may transmit a capability message to the BS indicating support by the UE for service type-specific cell mobility protocols. The BS may subsequently transmit the SIB scheduling the service type specific SIBs to the UE in response to the receiving the UE capability message by broadcasting the SIB to schedule upcoming service type-specific SIBs and/or using a dedicated message for the UE.

Service Type Specific Cell Selection/Re-Selection Parameters

In the case of 5G NR, given the wide spectrum of devices which are expected to derive service from the 5G RAN, it may be advantageous for the service-specific requirements to be factored in while a UE is selecting and/or reselecting to a cell. For example, a low power cellular internet-of-things (IoT) device may have a different maximum output transmit power, receive level sensitivity, and/or path loss criteria compared to a smartphone, which in turn may have different criteria compared to a wearable device. Employing service type specific mobility parameters may allow devices with different device characteristics (in terms of use cases, receiver sensitivity, antenna configuration, battery size, power budget, etc.) to be distinguished and provided customized camping criteria, commensurate with their respective capabilities. In order to support devices with such service requirements, the BS may advertise a set of cell-specific cell selection/re-selection parameters in system information blocks, specific to individual service types supported by that cell.

As one example, a sample SystemInformationBlockTypeX which provides a set of cell selection/re-selection parameters to UEs for a given service type (X) may comprise the following information:

```
SystemInformationBlockTypeX {
... cellSelectionInfo
{
q_RxLevMin_Q-RxLevMin_X,
q_RxLevMinOffset_Q-
RxLevMinOffset_X
}
cellReselectionInfoCommon {
    q_Hyst_Q-Hyst_X
},
cellReselectionServingFreqInfo { s_NonIntraSearch_S_NonIntraSearch_X,
    threshServingLow_ThresServingLow_X,
    cellReselectionPriority_CellReselectionPriority_X,
},
intraFreqCellReselectionInfo { q_RxLevMin_Q-
    RxLevMin_X, s_IntraSearch_S-
    IntraSearch_X, neighCellConfig
    NeighCellConfig_X, cellBarred
    Barred_X,
}
...
}
```

The elements in the example System Information Block message are described in the following numbered paragraphs:

Q-RxLevMinX—Refers to the Minimum RX level (in dBm) required for the UE supporting the given service type (X) to successfully camp on this current cell Q-RxLevMinOffsetX—Refers to the Offset that is to be applied for the signaled Q-RxLevMinX, which is to be considered to determine the path loss while camping in the cell Q-HystX—Refers to a hysteresis to be applied for cell ranking criteria, used for cell reselection, while supporting a given service type X S_NonIntraSearchX—Refers to the Path loss threshold (in dB) which may be satisfied before triggering reselection (for interFreq/interRAT reselection), for those UEs supporting a given service type X ThreshServingLowX—Refers to the Path loss threshold (in dB) used by the UE in serving cell while reselecting towards lower priority RAT/frequency, while supporting a given service type X CellReselectionPriorityX—Refers to the absolute cell reselection priority of the serving cell used for cell reselection, while supporting a given service type X S-IntraSearchX—Refers to the Path loss threshold (in dB) which may be satisfied before triggering reselection (for intraFreq reselection), for those UEs supporting a given service type X NeighCellConfigX—Refers to any other relevant neighbor cell configuration (Frequency/Cell ID etc), which are candidates for cell reselection for those UEs supporting a given service type X BarredX—Refers to any barring information applicable for this cell, used by UEs during cell reselection based on a given service type X Broadly speaking, the elements of the service type-specific SIB given in the example above allows that measurement offsets may be provided per service type so that cell reselections may be customized based on service type and devices with certain service type support may reselect to appropriate cells more quickly. Note that the above set of parameters are only illustrative, and are not intended to limit the extent of the embodiments envisioned by this disclosure. Parameters in the service type-specific SIBs may be added, deleted, and/or modified to cover future design aspects for the system, and the current disclosure is intended to cover these future embodiments as well.

Service Type Aware Neighboring Cell List

In order to improve continuity of services as part of idle/connected mode mobility, it may be advantageous for a UE to prioritize cell reselection/handover to those cells (e.g., Intra-Frequency/Inter-Frequency/Inter-RAT) that support services that the UE is interested in. To accomplish this, in some embodiments the BS may construct an intra-frequency/inter-frequency/inter-RAT neighboring cell list that specifies service-type specific support information, SIB scheduling information, and/or other concise information with which the UE may derive the list of service types supported by the neighbor cells. In some embodiments, such a list may not be made available by the current serving cell, and the UE may implement proprietary schemes to read relevant neighbor cell system information which may provide the required neighbor cell service type information.

In some embodiments, a UE exiting radio resource control (RRC) connected mode and entering either RRC inactive or RRC idle mode may benefit if it is redirected to a cell which supports service types commensurate with the service types that the UE supports. For example, the UE may be camped on a BS that supports RRC connected mode, but does not support one or more of RRC inactive and RRC idle mode. If the base station receives an indication from the UE that the UE will be transitioning to RRC inactive or RRC idle mode, the BS may supply redirection information to the UE as part of an RRCConnectionRelease message (e.g. as part of IdleModeMobilityControlInfo). According to some embodiments, the RRCConnectionRelease message may explicitly indicate a target cell for redirection, taking into account a service type preference of the UE. For example, the base station may determine that the UE has a preference for a particular service type (e.g., service type A). The base station may make this determination based on the UE having previously engaged in communication with the BS according to service type A, or the UE may have previously explicitly informed the BS of the UE's service type preference, according to various embodiments. The BS may have stored thereupon a list of neighboring cells, and may find a neighboring cell on the list that supports the preferred service type of the UE and may indicate that the UE redirects to this neighboring cell in the RRCConnectionRelease message.

Alternatively, in some embodiments the BS may provide a list of redirected cells and their corresponding supported service type information, so that the UE may choose to select one based on its service type support preferences. In these embodiments, the UE may indicate the chosen redirected cell in the RRCConnectionReleaseComplete message back to the NW, if necessary and/or desirable.

Handover to Compatible Service Group Cells

In some embodiments, a UE in connected mode with a BS may indicate to the BS the service types for which the current RRC Connection is being used (e.g. in a measurement report, in UE assistance information, or during an initial RRC Connection Setup procedure). Based on this information, the BS may configure one or more connected mode neighbors that support those service types. In addition, the BS may potentially configure measurement thresholds per service type. Optionally the BS may configure a service group ID in addition to existing measurement ID and report ID as part of RRC configuration for connected mode, to solicit measurement feedback from UEs based on a configured service group ID.

Figure 6:
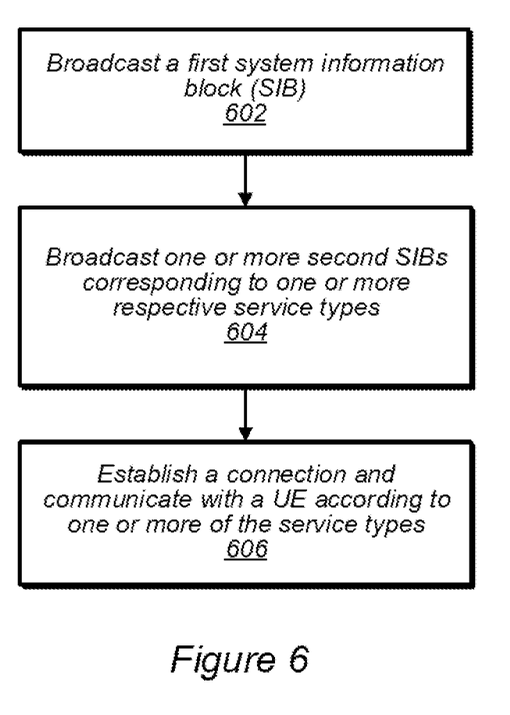
FIG. 6 is a flowchart diagram illustrating an exemplary method for implementing service type specific system information messaging, according to some embodiments.

FIG. 6—Broadcasting Service Type-Specific System Information

FIG. 6 is a flowchart diagram illustrating a method for a base station to supply service type-specific information to a user equipment device (UE). Aspects of the method of FIG. 6 may be implemented by a wireless device, a base station, and/or a network, such as a UE 106, the BS 102, and/or the network 100 (e.g., a 5G AMF) illustrated in and described with respect to various of the Figures herein, or more generally in conjunction with any of the computer systems or devices shown in the above Figures, among other devices, as desired. In various embodiments, some of the elements of the methods shown may be performed concurrently, in a different order than shown, may be substituted for by other method elements, or may be omitted. Additional method elements may also be performed as desired. As shown, the method of FIG. 6 may operate as follows.

At 602, the base station (BS) broadcasts a first system information block (SIB) comprising scheduling information for one or more second SIBs, wherein the first SIB indicates support by the base station for one or more service types, wherein each of the one or more second SIBs corresponds to a respective service type of the one or more service types, and wherein the second SIBs describe service type-specific capabilities of the base station. In some embodiments, the scheduling information may comprise a periodicity and mapping information associated with each of the plurality of second SIBs. For example, the first SIB may specify a periodicity with which each of the one or more second SIBs will be subsequently broadcast, as well as mapping information regarding the particular time and/or frequency resources related to said broadcasts.

In some embodiments, the base station may indicate support for the one or more service types by including, in the first SIB, a bitmap information element specifying the one or more service types that are supported by the base station. For example, as explained in greater detail above, the first SIB may include a service group indicator (SGI) bitmap that indicates whether the base station supports one or more of a plurality of service types. In some embodiments, the service types that are supported by the base station may comprise one or more of enhanced mobile broadband (EMBB), ultra-reliable low latency communications (URLLC), and massive machine-type communications (MMTC).

In some embodiments, each of the second SIBs contains cell selection or cell reselection parameters specific to its respective service type. For example, each of the second SIBs may specify parameters for performing cell selection and/or reselection for its respective service type.

In some embodiments, prior to transmitting the first SIB to the UE, the BS may receive a UE capability message from the UE indicating support by the UE for service type-specific cell mobility protocols. In these embodiments, the BS may transmit the first SIB to the UE in response to the receiving the UE capability message.

At 604, the BS broadcasts the one or more second SIBs corresponding to the one or more service types. The broadcasting of the one or more second SIBs may be performed according to the scheduling information of the first SIB. For example, the second SIB(s) may be broadcast according to the periodicity and/or the mapping information indicated in the first SIB. The UE may monitor radio resources for one or more of the second SIBs, wherein the radio resources are selected for monitoring based on a preference of the UE for one or more service types of the one or more service types associated with, respectively, the one or more second SIBs.

At 606, the BS may establish a connection and communicate with the UE using one or more of service types and according to the service type-specific capabilities described by second SIBs corresponding to the one or more service types. For example, the UE may perform cell selection or cell reselection onto the base station based on the cell selection or cell reselection parameters included in one or more of the second SIBs. The UE may establish a connection and communicate with the base station according to one or more of the service types supported by the base station.

In some embodiments, after establishing a connection with the UE, the base station may transmit a neighboring cell list to the UE, wherein the neighboring cell list specifies a frequency and a list of supported services associated with each of one or more neighboring cells. The neighboring cell list may be useable by the UE to select a neighboring cell for cell selection, cell reselection, handover, or redirection. For example, the UE may select a neighboring cell based on support of the selected neighboring cell for one or more service types preferred by the UE.

In some embodiments, the base station may be configured to support radio resource control (RRC) connected mode connections with the UE, but may not configured to support one or more of RRC idle mode connections and RRC inactive mode connections with the UE. In these embodiments, after the base station establishes an RRC connection with the UE, the base station may desire to direct redirect the UE to an appropriate neighboring base station if the UE indicates that it is going to transition from an RRC connected mode to an RRC idle or inactive mode. In these embodiments, subsequent to establishing the connection with the UE, the base station may receive service type preference information from the UE indicating a preference of the UE for one or more service types. The base station may then receive a notification from the UE that the UE intends to transition from a RRC connected mode to an RRC inactive or RRC idle mode. In response to receiving the notification, the base station may transmit an RRC connection release message, and the RRC connection release message may indicate a neighboring cell for the UE to reselect to in the RRC inactive or RRC idle mode. The neighboring cell may be selected by the base station based on a compatibility of the neighboring cell with the service type preference information received from the UE.

In other embodiments, in response to receiving the notification that the UE intends to transition from the RRC connected mode to an RRC inactive or an RRC idle mode, the base station may transmit an RRC connection release message, and the RRC connection release message may contain a list of neighboring cell reselection candidates. The list of neighboring cell reselection candidates may specify service types supported by each of the neighboring cell reselection candidates. The list of neighboring cell reselection candidates may be useable by the UE to select a neighboring cell for reselection (e.g., the UE may select a neighboring cell that supports a service type preferred or desired by the UE) when the UE enters the RRC idle or RRC inactive mode.

In some embodiments, the base station may determine that a handover procedure will be performed to handover the RRC connection with the UE to a neighboring cell. For example, the UE may initiate the handover procedure and may transmit a handover notification to the base station. Alternatively, the base station may autonomously initiate the handover procedure. In response to determining that the handover procedure will be performed, the base station may select the neighboring cell for performing the handover procedure from a list of neighboring cells based on a comparison of one or more service types used in the RRC connection with the UE and service type support information associated with each of the neighboring cells in the list of neighboring cells. Alternatively, in some embodiments the base station may receive preference information from the UE (e.g., potentially through the RRC connection) indicating a preference of the UE for one or more service types, and the base station may select the neighboring cell for performing the handover based on the preference information.

The base station may subsequently cause the UE to perform the handover procedure with the selected neighboring cell. For example, the base station may transmit handover information to the UE comprising frequency information associated with the neighboring cell, useable by the UE for performing the handover. The handover information may be transmitted in response to the base station receiving the preference information from the UE and initiating the handover procedure with the UE.

Summary

In some embodiments, a BS may broadcast information to indicate to the UEs the list of service types that it supports in the current serving cell. The UE may transmit capability information to the BS to indicate support for service type based mobility, prior to receiving the broadcast information from the BS. The BS may optionally broadcast service type specific cell selection/re-selection parameters. UEs may use these specific configurations to prioritize cell selection/re-selection to cells that support those service types that the UE is interested in. The BS may indicate supported service type information along with the idle/connected mode neighboring cell list. UEs may take into account this service type information to prioritize those cells for idle/connected mode measurements that match the service type that the UE is interested in. The BS may use the information on the current set of services being supported in connected mode, to handover the UE to one of the connected mode neighbors which supports those services that the UE is interested in and/or that the UE is currently using with the BS. The BS may indicate supported service type information in the redirection information to redirect the UE to RRC idle or inactive mode in a cell compatible with the service types that the UE is interested in.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for supplying service type-specific information to a user equipment device (UE), the method comprising, by a base station:
broadcasting a first system information block (SIB) comprising scheduling information for a plurality of second SIBs, wherein the first SIB indicates support by the base station for a plurality of service types, wherein said indicating support by the base station for the plurality of service types comprises including, in the first SIB, a bitmap information element specifying the plurality of service types that are supported by the base station, wherein each of the plurality of second SIBs corresponds to a respective service type of the plurality of service types, and wherein the second SIBs describe service type-specific capabilities of the base station;
broadcasting the plurality of second SIBs according to the scheduling information of the first SIB; and
establishing a connection and communicating with the UE using one or more service types of the plurality of the service types and according to the service type-specific capabilities described by second SIBs corresponding to the one or more service types.

2. The method of claim 1,
wherein said scheduling information comprises a periodicity and mapping information associated with each of the plurality of second SIBs.

3. The method of claim 1, wherein the plurality of service types comprise two or more of:
enhanced mobile broadband (EMBB);
ultra-reliable low latency communications (URLLC); and
massive machine-type communications (MMTC).

4. The method of claim 1,
wherein each of the second SIBs contains cell selection or cell reselection parameters specific to its respective service type.

5. The method of claim 1, the method further comprising:
prior to transmitting the first SIB to the UE, receiving a UE capability message from the UE indicating support by the UE for service type-specific cell mobility protocols,
wherein said transmitting the first SIB to the UE is performed in response to the receiving the UE capability message.

6. The method of claim 1, the method further comprising:
transmitting a neighboring cell list to the UE, wherein the neighboring cell list specifies a list of one or more frequencies and a list of supported services associated with each of one or more neighboring cells.

7. The method of claim 1,
wherein the base station is configured to support radio resource control (RRC) connected mode connections with the UE, but is not configured to support one or more of RRC idle mode connections and RRC inactive mode connections with the UE, wherein the method further comprises:
receiving service type preference information from the UE indicating a preference of the UE for one or more of the plurality of service types;
receiving a notification from the UE that the UE intends to transition from a RRC connected mode to an RRC inactive or RRC idle mode;
in response to receiving the notification, transmitting an RRC connection release message, wherein the RRC connection release message indicates a neighboring cell for the UE to reselect to in the RRC inactive or RRC idle mode, wherein the neighboring cell is selected by the base station based on a compatibility of the neighboring cell with the service type preference information received from the UE.

8. The method of claim 1,
wherein the base station is configured to support radio resource control (RRC) connected mode connections with the UE, but is not configured support one or more of RRC idle mode connections and RRC inactive mode connections with the UE, wherein the method further comprises:
receiving a notification from the UE that the UE intends to transition from a RRC connected mode to an RRC inactive or RRC idle mode;
in response to receiving the notification, transmitting an RRC connection release message, wherein the RRC connection release message comprises a list of neighboring cell reselection candidates, wherein the list of neighboring cell reselection candidates specifies service types supported by each of the neighboring cell reselection candidates, and wherein the list of neighboring cell reselection candidates is useable by the UE to select a neighboring cell for reselection when the UE enters the RRC idle or RRC inactive mode.

9. The method of claim 1, the method further comprising:
establishing a radio resource control (RRC) connection with the UE;
determining that a handover procedure will be performed to handover the RRC connection with the UE to a neighboring cell;
selecting the neighboring cell from a list of neighboring cells based on a comparison of one or more service types used in the RRC connection with the UE and service type support information associated with each of the neighboring cells in the list of neighboring cells; and
performing the handover procedure with the selected neighboring cell.

10. A base station (BS), comprising:
a radio, comprising one or more antennas configured for wireless communication;
a processing element operably coupled to the radio;
wherein the BS is configured to:
broadcast a first system information block (SIB) comprising scheduling information for one or more second SIBs, wherein the first SIB indicates support by the base station for one or more service types, wherein said indicating support by the base station for the one or more service types comprises including, in the first SIB, a bitmap information element specifying the one or more service types that are supported by the base station, wherein each of the one or more second SIBs corresponds to a respective service type of the one or more service types, and wherein the second SIBs are useable by a user equipment (UE) to determine service type-specific capabilities of the base station;
broadcast the one or more second SIBs according to the scheduling information of the first SIB; and
establish a connection and communicate with the UE using the one or more service types and according to the service type-specific capabilities described by second SIBs corresponding to the one or more service types.

11. The BS of claim 10, wherein the one or more service types comprise one or more of:
enhanced mobile broadband (EMBB);
ultra-reliable low latency communications (URLLC); and
massive machine-type communications (MMTC).

12. The BS of claim 10,
wherein the base station is configured to support radio resource control (RRC) connected mode connections with the UE, but is not configured to support one or more of RRC idle mode connections and RRC inactive mode connections with the UE, wherein the method further comprises:
receiving service type preference information from the UE indicating a preference of the UE for one or more of the one or more service types;
receiving a notification from the UE that the UE intends to transition from a RRC connected mode to an RRC inactive or RRC idle mode;
in response to receiving the notification, transmitting an RRC connection release message, wherein the RRC connection release message indicates a neighboring cell for the UE to reselect to in the RRC inactive or RRC idle mode, wherein the neighboring cell is selected by the base station based on a compatibility of the neighboring cell with the service type preference information received from the UE.

13. The BS of claim 10,
wherein the BS is further configured to support radio resource control (RRC) connected mode connections with the UE, but is not configured support one or more of RRC idle mode connections and RRC inactive mode connections with the UE, wherein the BS is further configured to:
receive a notification from the UE that the UE intends to transition from a RRC connected mode to an RRC inactive or RRC idle mode;
in response to receiving the notification, transmit an RRC connection release message, wherein the RRC connection release message comprises a list of neighboring cell reselection candidates, wherein the list of neighboring cell reselection candidates specifies service types supported by each of the neighboring cell reselection candidates, and wherein the list of neighboring cell reselection candidates is useable by the UE to select a neighboring cell for reselection when the UE enters the RRC idle or RRC inactive mode.

14. The base station of claim 10,
wherein the scheduling information comprises a periodicity and mapping information associated with each of the one or more second SIBs.

15. The base station of claim 10,
wherein each of the one or more second SIBs contains cell selection or cell reselection parameters specific to its respective service type.

16. A user equipment (UE), comprising:
a radio, comprising an antenna configured for wireless communication; and
a processing element operably coupled to the radio,
wherein the processing element and the radio are configured to:
receive a first system information block (SIB) from a base station, wherein the first SIB comprises scheduling information for a plurality of second SIBs, wherein the first SIB indicates support by the base station for a plurality of service types, wherein said indicating support by the base station for the plurality of service types comprises including, in the first SIB, a bitmap information element specifying the plurality of service types that are supported by the base station, wherein each of the plurality of second SIBs corresponds to a respective service type of the plurality of service types, and wherein the second SIBs describe service type-specific capabilities of the base station;
monitor radio resources for one or more of the second SIBs, wherein the radio resources are selected for monitoring based on a preference of the UE for one or more service types of the plurality of service types associated with, respectively, the one or more second SIBs; and
establish a connection and communicating with the base station using the one or more service types of the plurality of the service types and according to the service type-specific capabilities described by the one or more second SIBs.

17. The UE of claim 16,
wherein said scheduling information comprises a periodicity and mapping information associated with each of the plurality of second SIBs.

18. The UE of claim 16, wherein the plurality of service types comprise two or more of:
enhanced mobile broadband (EMBB);
ultra-reliable low latency communications (URLLC); and
massive machine-type communications (MMTC).

19. The UE of claim 16, wherein the radio and the processing element are further configured to:
prior to receiving the first SIB to the UE, transmit a UE capability message to the base station indicating support by the UE for service type-specific cell mobility protocols,
wherein the radio and the processing element are configured to receive the first SIB in response to the transmitting the UE capability message.

20. The UE of claim 16, wherein the radio and the processing element are further configured to:
establish a radio resource control (RRC) connection with the base station;
transmit, through the RRC connection, preference information indicating a preference of the UE for one or more service types of the plurality of service types;
initiate a handover procedure with the base station to handover the RRC connection with the base station to a neighboring cell;
receive handover information from the base station, wherein the handover information comprises a frequency associated with a neighboring cell for performing the handover, wherein the handover information is received in response to transmitting the preference information to the base station and initiating the handover procedure with the base station; and
perform the handover procedure with the neighboring cell.

* * * * *